(12) United States Patent
Hogan et al.

(10) Patent No.: US 6,303,694 B1
(45) Date of Patent: Oct. 16, 2001

(54) COMPOUNDING PROCESS FOR ACHIEVING UNIFORM, FINE PARTICLE SIZE DISPERSION OF CURING AGENTS IN THE SUBSTANTIAL ABSENCE OF SOLVENTS AND A SEALANT PRODUCED THEREBY

(75) Inventors: Terrence E. Hogan, Cuyahoga Falls; William L. Hergenrother, Akron; Christine Morehart, North Canton, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/507,381

(22) Filed: Feb. 18, 2000

(51) Int. Cl.⁷ .............................. C08F 8/00; C08L 23/00; C08L 23/04
(52) U.S. Cl. ...................... 525/192; 525/194; 525/232; 525/236; 525/237; 525/240; 525/241
(58) Field of Search .................................. 525/192, 194, 525/232, 236, 237, 240, 241

(56) References Cited

U.S. PATENT DOCUMENTS

| | | |
|---|---|---|
| 3,859,258 | 1/1975 | Manino . |
| 4,068,027 * | 1/1978 | Ornum ................................. 427/230 |
| 4,130,534 * | 12/1978 | Coran et al. .......................... 525/133 |
| 4,367,097 | 1/1983 | Sakanaka et al. . |
| 4,424,295 * | 1/1984 | Ornum et al. ........................ 524/526 |
| 4,588,637 | 5/1986 | Chiu . |
| 4,616,048 | 10/1986 | DeTrano et al. . |
| 5,095,068 | 3/1992 | Chiu . |
| 5,128,392 | 7/1992 | DeTrano et al. . |
| 5,295,525 | 3/1994 | Sanda . |
| 5,563,217 * | 10/1996 | Davis et al. .......................... 525/194 |
| 5,888,602 | 3/1999 | Davis et al. . |
| 5,914,157 | 6/1999 | Munson et al. . |

FOREIGN PATENT DOCUMENTS

| | | |
|---|---|---|
| WO 99/47343 | 9/1999 | (WO) . |
| WO 00 59988 | 10/2000 | (WO) . |

* cited by examiner

*Primary Examiner*—Nathan M. Nutter
(74) *Attorney, Agent, or Firm*—David G. Burleson; Scott A. McCollister

(57) ABSTRACT

A process for the preparation of a sealant composition by mixing an elastomer in the substantial absence of an organic solvent and separately dispersing a quinoid curing agent in a polymer having a molecular weight below about 5,000 to form a curing agent concentrate. Thereafter, combining the curing agent concentrate with the elastomer to form the sealant composition. The composition is a rubber masterbatch having many applications and is advantageously, substantially free from organic solvents.

24 Claims, No Drawings

COMPOUNDING PROCESS FOR ACHIEVING UNIFORM, FINE PARTICLE SIZE DISPERSION OF CURING AGENTS IN THE SUBSTANTIAL ABSENCE OF SOLVENTS AND A SEALANT PRODUCED THEREBY

FIELD OF INVENTION

The present invention relates to compounding of quinoid curing agents, dry rubber blends including the curing agent, and sealants useful for various applications including sealants for tubeless pneumatic rubber tires to minimize loss of air due to punctures resulting from road debris such as nails.

BACKGROUND OF THE INVENTION

A frequently used curative for pneumatic tire sealant compositions is a quinoid type system, which generally comprises a quinoid and an activator. The activator, often described as a cocuring agent or "B" component, is used to achieve crosslinking in association with the dormant quinoid uniformly distributed as a curing agent into the elastomer or rubber (such blend being called an "A" component). The terms "elastomer" and "rubber" will be used interchangeably in this specification.

Traditionally, the quinoid rubber curing agent is solution compounded into the elastomer to form component A. This solution compounding usually achieves a uniform distribution of the curing agent in the elastomer. The quinoid curing agent is initially solubilized in an organic, polar solvent and then mixed with a rubber "masterbatch" (high molecular weight elastomer; low molecular weight tackifier; reinforcing agent; solvent). The various solvents are then removed to yield a uniform fine distribution of curing agent in elastomer ("component A") to form a dry blend for later crosslinking the elastomer once the curing agent and the co-curing agent come together.

While many solvent processes in rubber compounding are acceptable for current manufacturing techniques, the use of organic, polar solvents in rubber compounding presents the expected issues of solvent purchasing and storage costs before manufacture, solvent removal costs during manufacture, solvent capture costs as a byproduct of manufacture, and other manufacturing costs involved with the use of solvents. Moreover, most rubber vulcanization processes begin with Banbury-type mixing techniques which is a dry, solid mixing process. Thus, the presence of solvents to intimately mix various ingredients is temporary.

SUMMARY OF THE INVENTION

The present invention solves a problem of solvent-blended processing of quinoid curing systems by minimizing the use of solvents for such curing systems.

The present invention advantageously provides a generally solvent free component A before mixing of component A with co-curing agent B. One aspect of the invention is a method of dispersing quinoid curing agents into an elastomer. Advantageously, the method preferably does not require either the use of polar, organic solvents to solubilize the quinoid before introduction into a rubber masterbatch or the use nonpolar organic solvents to dissolve the elastomer or other components of the rubber masterbatch. The general avoidance of these solvents from the production process eliminates the costly step of removing the solvents from the final product and produces a product having more consistent cure times.

Another aspect of the present invention is a generally solvent free rubber masterbatch for sealant compositions.

Another aspect of the present invention is a use of a quinoid curing agent in a solvent-less process to make elastomeric sealant compositions.

Another aspect of the present invention is a solvent-free elastomeric sealant composition.

These and other aspects of the present invention will become apparent from the following specification, which describes in detail the invention. In general, the present inventive process is directed to compounding a quinoid curing agent for a sealant composition by mixing an elastomer, optionally and preferably, in the substantial absence of an organic solvent. A quinoid curing agent is separately dispersed in a polymer having a molecular weight below about 5,000 to form a curing agent concentrate. The curing agent concentrate is then combined with the elastomer to form the sealant composition.

Alternatively, the curing agent may be added without first dispersing in a polymer but in the absence of an organic solvent.

Preferably, the elastomer comprises at least one polymer having a molecular weight above about 50,000 and at least one polymer having a molecular weight below about 5,000. Typically, the curing agent has a particle size less than about 5 microns and comprises from about 0.2 to about 2.0 parts by weight per hundred parts of elastomer/rubber (phr) of the sealant composition.

As stated above, in the present process, the curing agent concentrate and the elastomer constituent are advantageously substantially free of organic solvent. Moreover, each includes less than about 10.0 weight percent of organic solvent.

A feature of the present invention is the compounding of the sealant composition in a generally solvent free environment, which minimizes the introduction and removal of solvent in middle steps of a sealant composition manufacturing process.

An advantage of the present invention is the reduction of costs associated with including solvents in compounding and then removing those same solvents before sealant composition curing.

Another advantage is improved properties of the sealant composition resulting from a substantially solvent-free compounding process.

EMBODIMENTS OF THE INVENTION

According to the present invention, a quinoid curing agent is readily and uniformly dispersed in rubber compositions, especially the rubber mixtures typically called the "A" component. The method is an improvement over the prior art because it achieves a uniform dispersion of small quinoid particles without the use of polar, organic solvents to solubilize the curing agent. This advantage over the art can be further improved by avoiding the use of a nonpolar organic solvent, previously used to reduce the viscosity of the rubber component.

The present invention also includes within its scope the use of peroxide co-curing agents, typically called the "B" component. The combination of the A and B components results in a composition that will readily cure at temperatures from about 15° C. to about 150° C. and maintain their crosslink density even though exposed to air and/or elevated temperatures.

The sealant composition of the present invention generally contains at least one high molecular weight elastomer(s)

as well as at least one elastomeric-type tackifier, all present in the rubber masterbatch.

Typically, the high molecular weight elastomer(s) which can be utilized in the present invention include ethylene-propylene-diene terpolymers (EPDM), polybutadiene, partially hydrogenated polybutadiene, butyl rubber, halo butyl rubber for example chloro- or bromo-, acrylonitrile-butadiene copolymer, styrene butadiene copolymer, natural rubber, or cis polyisoprene and the like. Mixtures of two or more of the above elastomers can also be used, as can various other conventional high molecular weight rubbers. The number average molecular weight of the high molecular weight elastomer is preferably at least about 50,000 and desirably at least about 100,000.

The elastomeric-type tackifiers utilized in the present invention are rubbery polymers of relatively low molecular weight. Generally, from about 55 to about 90 percent by weight of the sealant rubber compound of the present invention is the tackifier with from about 65 or 75 percent to about 90 percent being preferred. The amount of the high molecular weight rubber compounds accordingly is from about 10 percent to about 45 percent by weight with from about 10 percent to about 25 or 35 percent being preferred. The stated weights are based on the total weight of the high and low molecular weight rubbers. However, other components of the specified present invention system may be based on 100 parts by weight of rubber (phr).

According to the method of this invention, the high molecular weight elastomer(s) and the low molecular weight polymers do not need to be solubilized ir a nonpolar solvent before the quinoid curing agent is added. Accordingly, the invention is directed to situations where less than 10%, more preferably less than 1%, and most preferably less than 0.1 wt. % nonpolar solvent is present in the rubber blend when the quinoid curing agent is added. While the term nonpolar organic solvent is a commonly used and a well understood term, for the purposes of this application it may include linear, branched and cyclic alkanes or alkenes of 4 to 30 carbon atoms, aromatics of 6 to 20 carbon atoms including naphthenic compounds, and other nonpolar hydrocarbon compounds of similar solubility parameters to the specified compounds.

The quinoid curing agents generally include any suitable quinonedioxime compound. The quinoid curing agent is generally utilized in an amount of from about 0.1 to about 5.0 parts by weight per 100 parts by weight of the total "A" component (i.e., the dry sealant component ). A desirable amount is from about 0.2 to about 2.0, with a preferred amount being from about 0.3 to about 1.0 parts by weight per 100 parts of the dry sealant component.

Suitable quinoid compounds include p-quinonedioxime, p-quinone dioxime diacetate, p-quinone dioxime dicaproate, p-quinone dioxime di-laurate, p-quinone dioxime distearate, p-quinone dioxime dicrotonate, p-quinone dioxime dinaphthenate, p-quinone dioxime succinate, p-quinone dioxime adipate, p-quinone dioxime difuroate, p-quinone dioxime dibenzoate, p-quinone dioxime di(o-chlorobenzoate), p-quinone dioxime di-(pchloro benzoate), p-quinone dioxime di-(p-nitro benzoate), p-quinone dioxime di-(m-nitro benzoate), p-quinonone dioxime di(3,5 dinitro benzoate), p-quinone dioxime di(p-methoxy benzoate), p-quinone dioxime di(n-amyl oxy benzoate), p-quinone dioxime di(m-bromo benzoate), p-quinone dioxime di-(phenyl acetate), p-quinone dioxime dicinnamate, p-quinone dioxime di-(N-phenyl carbamate), bis ethoxy methyl ether of quinone dioxime, mono-zinc salt of quinone dioxime, di-zinc salt of quinone dioxime, zinc chloride double salt of quinone dioxime, mono mercury salt of quinone dioxime, dimercuric salt of quinone dioxime, mercuric chloride double salt of quinone dioxime, mono-barium chloride double salt of quinone dioxime, monocupric salt of quinone dioxime, mono-lead salt of quinone dioxime, mono-barium salt of quinone dioxime, mono-magnesium salt of quinone dioxime, monocalcium salt of quinone dioxime, silver salt of p-quinone dioxime, 1,4-naphthoquinone dioxime, chloro methyl quinone dioxime, 2,6-dimethyl 1,4-quinone dioxime, 2-phenyl-1,4-quinone dioxime, thymo quinone dioxime, 2chloron-uinone dioxime, thymo quinone dioxime dibenzoate, thymo quinone dioxime diacetate, p-quinone dioxime phosphochloride, and the like, and mixtures thereof. A preferred quinoid compound is benzoquinone dioxime.

Prior to adding the curing agent to the rubber masterbatch, the curing agent is dispersed in a low molecular weight polymer, for example, those having a number average molecular weight of about 500 to about 5,000 and which are often liquids at room temperature (that is about 20° C. to about 25° C.).

Many types of low molecular weight polymers in liquid form are useful including ethylene-propylene copolymer (EP), ethylene-propylene-diene terpolymer (EPDM), polybutadiene (PBD), hydrogenated PBD, butyl rubber (BR), polypropylene (e.g. atactic), acrylonitrileWutadiene copolymer (ANB), styrene-butadiene copolymer (SBR), synthetic polyterpenes, thermoplastic olefins, pentaerythritol esters of hydrogenated rosins, triethylene glycol esters of hydrogenated rosins, vinyl toluene copolymers, alkyl aromatics, coumarone-indenes, depolymerized natural rubber (DPR) and polybutenes. Because of their cost, availability and properties, the polybutenes are particularly useful.

Such polybutenes preferably have a number average molecular weight exceeding about 1000 to minimize the possibility of migration into adjacent tire components. It is preferably prepared by polymerizing an isobutylene rich stream with a metal halide catalyst and preferably has a polymer backbone structure resembling polyisobutylene. Very suitable polybutenes are available under the trademark Indopol, e.g. Indopol H-300 and Indopol H-1 900, from Amoco. The manufacturer indicates that these Indopols have a polymer backbone structure resembling isobutylene and that the Indopol H-300 and Indopol H-1900 have viscosities ranging from about 627–675, to about 4069–4382 centistokes, respectively at 210° F. (ASTM D-445). The number average molecular weights (Mn) of the same materials is respectively from about 1290 to about 2300, as determined by vapor pressure osmometry. In addition to the above commercially available polymers, an aliphatic type can be utilized, alone or in combination, such as Piccotac B-BHT which is manufactured by Hercules.

In the embodiment of invention wherein the curing agent concentrate is used, respectively, the low molecular weight polymer preferably makes up about to about 99%, more preferably about 50 to about 95%, most preferably about 70 to about 90% and the curing agent about 99 to about 1%, more preferably about 50% to about 5%, and most preferably about 30% to about 10%/o, of the curing agent concentrate mixture. In this regard, the resultant curing agent concentrate is substantially free of organic solvent, i.e., it includes less than about 10%, preferably less than about 1%, and more preferably less than about 0.1% of an organic solvent.

Furthermore, the overall component "A" preferably includes less than about 5 wt. % total solvent (polar and nonpolar), and more preferably less than about 1 wt. % based on the total weight of the dry component. More specifically, component A of the present invention includes less than 10 ppm THF and hexane. More preferably, less than 1 ppm of either THF or hexane is present. In fact, a headspace/gas chromatographic analysis showed the dry component can have less than 0.0001 wt % (<1 ppm) THF and hexane as opposed to the 0.179wt % (1790 ppm) THF and 0.839 wt % (8390 ppm) hexane present in desolventized dry components obtained from a solvent based process.

Preparation of a sealant composition of the present invention is generally as follows: Initially, a mixed rubber masterbatch is prepared. The masterbatch generally contains the high molecular weight elastomer(s) such as EPDM and a portion of the various low molecular weight tackifiers. The masterbatch also usually contains a reinforcing agent such as carbon black or other suitable agents as set forth hereinbelow. The masterbatch is desirably mixed in a high shear mixer such as a sigma blade kneader extruder, Brabender Plastographlm, other extruder (e.g. twin-screw) etc. A quinoid curing agent concentrate is formed by mixing the curing agent into a low molecular weight polymer using a three roll mill.

The quinoid curing agent(s) concentrate, which is dispersed in the low molecular weight polymer, is then added to the mixer usually with slight heat, under agitation so as to disperse and precipitate the quinoid as very fine particles in the rubber. The above mixture of materials generally is referred to as a rubber mixture or blend. Advantageously this mixture does not have to be desolventized. This significantly increases production speed and reduces production costs and environmental considerations. The resultant mixture is the dry sealant component or component A identified above. The dry sealant component can be stored in any suitable manner until required.

The addition of the quinoid mixture into the rubber masterbatch is carried out in a manner such that a very fine dispersion of the quinoid rubber mixture during mixing. The precipitated quinoid curing agent should have a number average particle size of less than 15 microns, desirably less than 10 microns and preferably less than 5 microns. It is important that the quinoid be thoroughly mixed with the rubber so that a uniform, preferably homogeneous distribution thereof is obtained. Generally, mixing occurs at a temperature of from about 20° C. to about 135 or 150° C. and preferably at a temperature of from about 25° C. to about 100 or 135° C.

Additionally, other ingredients which can be utilized to prepare the rubber blend include various reinforcing agents. A suitable agent includes finely divided carbon such as carbon black. Other suitable reinforcing agents include zinc oxide, aluminum hydrate, lithopone, whiting, clays, hydrated silicas, calcium silicates, silicoaluminates, magnesium oxide, and magnesium carbonate. The amount of such reinforcing agents is from about 0.1 to about 50 parts, and desirably from about 1 to about 20 parts by weight per 100 parts by weight of said dry sealant component (phr).

Another desirable ingredient is a surfactant. It is preferred but not required that the surfactant be blended with the quinoid and the low molecular weight polymer mixture before they are added to the rubber masterbatch. It is thought that the surfactant stabilizes the growth of small quinoid particles. Generally, any suitable surfactant can be utilized such as lecithin. The amount of the surfactant is from 0.001 to about 2 percent by weight based upon the total weight of said dry sealant component. Other surfactants include conventional anionic as well as nonionic surfactants such as various carboxylic acid salts, such as common soap, naphthenates; various sulfuric esters such as alkyl sulfates; sulfated oils; various ether sulfates, such as sodium poly (ethylene-oxide)-sulfate; various sulfonates such as alkyl and alkyl-aryl sulfonates; various phosphates and phosphonates such as alkyl phosphates and alkyl phosphonates; various ethers; various esters and various amides.

The "B" co-curing agent component to be mixed with the rubber masterbatch is generally a peroxide. A nonexclusive list of organic peroxides includes benzoyl peroxide; t-butylperoxypivalate; 2,4-dichloro-benzoyl peroxide; decanoylperoxide; propionyl peroxide; hydroxyheptyl peroxide; cyclohexanone peroxide; 2,5-dimethylhexyl-2,5-di (peroxy-benzoate); t-butyl perbenzoate; dicumyl peroxide; 2,5-dimethyl-2,5-di(t-butylperoxy)hexyne-3; 2,5-di methyl 2,5-di(tbutylperoxy)hexane; 3,5-dimethyl-2,5-di(benzoyl-peroxy)hexane; di-t-butyl peroxide; p-menthane hydroperoxide; cumene hydroperoxide; 2,5-dimethyl-2,5-di (hydroperoxy)hexane; t-butyl hydroperoxide; lauroyl peroxide; t-amyl perbenzoate; or mixtures therof. Preferred organic peroxides are benzoyl peroxide and t-butyl perbenzoate. Mixtures of two or more of the above peroxides can also be used. Other useful peroxide curing agents are known to those skilled in the art. See, for example, Kirk Othmer Encyclopedia of Chemical Technology, $4^{th}$ Ed., Vol. 18, pp. 298–310.

If the peroxide curing agent is solid at room temperature, it usually has a number average particle size of less than 15 microns, desirably less than 10 microns and preferably less than 5 microns. Such fine particle peroxides are added to a vessel. A low molecular weight tackifier, as set forth above, is also added and generally serves as a carrier for the various ingredients. The amount of tackifier generally ranges from about 20 parts to about 50 parts by weight based upon the total amount of weight olf said "B" component.

Another optional component, which can be added to the "B" component, is a polar solvent accelerator which are utilized in the amount of from about 0.0 or 0.1 to about 20 and desirably about 0.5 to about 15 parts by weight per 100 parts by weight of the "B" component. In the present invention, it is preferred that the peroxide curing compounds be either predispersed in the polar solvent accelerator prior to incorporation into the "B" component or sequentially or jointly added thereto. Suitable polar solvent accelerators include water, primary, secondary and tertiary alcohols and polyols such as aliphatic, cycloaliphatic and aromatic alcohols containing from 1 to 12 carbon atoms as for example methanol, ethanol, propanol, butanol, n-octanol, n-heptanol, n-hexanol, iso-octanol, 2,2-dimethyl-hexane6-ol, t-amyl alcohol, 4-methyl cyclohexanol, benzyl alcohol, butanediol, propylene glycol and ethylene glycol,; ketones, such as ethyl methyl ketone and cyclohexanone; aldehydes suchi as benzaldehyde, acetaldehyde and propionaldehyde; ethers such as tetrahydrofuran, dioxane, dioxalane and diethyl ether; alkyl and aromatic nitriles such as propionitrile and benzonitrile; acids such as phosphoric acid, acetic acid and propionic acid; aqueous bases such as NaOH; and esters such as dimethyl succinate and diethyl succinate. Dipolar, aprotic compounds such as dialkyl formamides, dialkyl acetamides and dialkylsulfoxides such as dimethylsufoxide are also useful. Mixtures of these accelerators can be utilized. The above polar accelerators can also serve to modify viscosity. Various compounds are mixed together with a sufficient amount of tackifier therein so that component "B" has a viscosity such that it is readily mixed with the "A" component.

It is usually desirable to support the peroxide co-curing agent on an inert filler carrier for reasons of safety and convenience in handling. Typical materials which can be utilized as solid supports for the above-identified peroxide curing agents include corn starch, wheat starch bases, clay, and inorganic phosphate bases such as calcium phosphate, such materials should be of a very fine particle size. Typical commercially available supported peroxides which may be utilized in the instant invention include: LUPERCO AA from Pennwaft Chemicals which contains approximately 33 percent benzoyl peroxide supported on a wheat starch base; and LUPERCO ACP from Pennwalt Chemicals which is approximately 35 percent benzoyl peroxide supported on an inorganic phosphate base.

Mixtures of the "A" component and the "B" component are accomplished in any suitable mixing device with the requirement that once these compounds are mixed together they are soon thereafter applied to the end product. The application time after mixing the A & B components is typically 0.1–30 minutes, more desirably 0.1–10, and preferably 0.1–5 minutes at a temperature from about 25 to about 130° C. Generally, an extruder is utilized such that the sealant composition is mixed and then is directly applied to its product location, preferably the inner portion of a pneumatic tire, within a very short period of time.

The amount of peroxide utilized on a molar basis is generally in excess of the quinoid curing agent. Thus, from 0.5 to about 10.0 moles and preferably from about 1.0 to about 5.0 moles of a peroxide compound is utilized per mole of quinoid curing agent Thus, from about 0.05 to about 10 parts, more desirably from about 0.1 to about 8 parts and preferably from about 0.3 to about 5 parts by weight of the peroxide is utilized per 100 parts by weight of the total sealant composition.

A sealant when made according to the compounding process of the present invention has the advantage of generally achieving a required balance of physical and rheological properties, essential for effective sealing performance. Moreover, since the quinoid curing agent, as well as the co-curing agent, is uniformly and efficiently dispersed in the substantial absence of solvent, the overall amount thereof utilized can be reduced resulting in lower sealant costs and excellent aging stability. Another advantage is that uniform consistency in reproducibility of the product results in greater process control during application of the sealant composition to its final location, such as to the fire. In addition to tires, the sealant material can be utilized as a caulking compound, roofing adhesive and contact adhesive.

The application of the sealant material to its final location, such as the tire, can occur in any conventional manner as by brushing, extrusion coating, and the like. Once applied to the tire or other article, the sealant can be cured. Curing can take place from ambient temperature, that is from about 15° C. to about 125 or 150° C. with from about 60° C. to about 100, 135 or 150° C. being preferred.

The embodiments of invention can also be understood by reference to the following examples.

EXAMPLES

Example 1

Preraration of Component A

To a 5L kneader-extruder (MXE6, Jaygo Inc.) equipped with sigma bladeis was added 0.90 kg of EPDM (Royalene 505) and 0.30 kg of carbon black (N326) at 76° C. The sigma blade speed was set at 35.0 rpm and the extruder speed at 40.0 rpm. Mixing was continued for 20 minutes over which time the temperature was raised to 84° C., and 0.34 kg of Indopol H-300 (Amoco poly(isobutylene), Mn=1290, viscosity=637–675 centistokes at 210° F. (STM D-445) was added. After 15 minutes, 0.36 kg of Indopol H-300 was again added and mixed for 45 minutes. At this time an additional 0.46 kg of Indopol H-300 was introduced and mixed for 40 minutes. To the mixer was then added 0.32 kg of piccotac B-BHT (Hercules Temperature=117° C.). Indopol H-1900 (poly(isobutylene), Mn=2300, viscosity= 4069–4382 centistoke at 210° F. (STM D-445)) 1.05 kg, 0.75 kg and 1.12 kg was then added after 3, 15 and 35 minutes respectively. Ten minutes after the final additional of H-1900, 0.174 kg of 16.7wt % benozquinone dioxime in H-300 was added at a temperature of 110° C. This was allowed to mix for 15 minutes, and then the product was extruded from the mixer.

Example 2

Preparation of Alternate Embodiment of Component A

To a 5L kneader-extruder (MXE-6, Jaygo Inc.) equipped with sigma blades was added 0.90 kg of EPDM (Royalene) and 0.30 kg of carbon black (N326) at 85° C. The sigma blade speed was set at 35.0 rpm and the extruder speed at 40.0 rpm. Mixing was continued for 20 minutes over which time the temperature was raised to I OBOC, and 0.36 kg of Indopol H-300 was added. After 25 minutes, 0.40 kg of Indopol H.-300 was again added and mixed for 20 minutes. At this time, an additional 0.40 kg of Indopol H-300 was introduced and mixed for 20 minutes. To the mixer was then added 0.32 kg of piccotac B-BHT (Temperature=124° C.). Indopol H-1900 (poly(isobutylene), Mn=2300, viscosity= 4069–4382 centistokes at 210° F. (STM D-445)) 0.90 kg, 1.02 kg and 1.00 kg was then added after 7, 25 and 35 minutes respectively. Ten minutes after the final additional of H-1900, 0.174 kg of 16.7wt % benzoquinone dioxime in H-300 was added at a temperature of 116° C. This was allowed to mix for 15 minutes, and then the product was extruded from the mixer.

Example 3

Preparation of Second Alternative Embodiment of Component A

To a 20 gallon kneader-extruder (MXE20, Jaygo, Inc.) equipped with sigma blades was added 10.92 kg of EPDM (Royalene 505) and 3.64 kg of carbon black, filler (N326) at 143° C. The sigma blade speed was set at 25.0 rpm and the extruder speed at 30.0 rpm. Mixing was continued for 25 minutes, and 4.66 kg of Indopol HI-300 (poly(isobutylene), Mn-1290, viscosity=637–675 centistokes at 210° F. (STM D-445)) was added. After 30 minutes, 4.61 kg of Indopol H-300 was added with 0.35 kg lecithin and mixed for 55 minutes. At this time, an additional 6.58 kg of Indopol H-300 was introduced and mixed for 10 minutes. To the mixer was then added 3.85 kg of piccotac B-BHT (Temperature=143° C.). Indopol H-1900 (poly(isobutylene), Mn=2:300, viscosity=4069–4382 centistokes at 210° F. (STM D-445)) 10.78 kg, 11.96 kg and 12.68 kg was then added after 5, 25, and 37 minutes respectively. Simultaneously to the final addition of H-1900, 0.35 kg benzoquinone dioxime was added at a temperature of 143° C. This was allowed to mix for 10 minutes, and then the product was extruded from the mixer.

Comparison Example A

Preparation of Comparative Component A- Using THF Solvent

To a 5L kneader-extruder (MXE-6, Jaygo Inc.) equipped with sigma blades was added 0.546 kg of EPDM (Royalene 505) at 80° C. Mixing was continued for 25 minutes over which time the temperature was raised to 130° C., and the EPDM became one mass. Carbon black (N326), 0.18 kg, was then introduced. After 30 minutes, a powder remained in the mixer and 0.79 kg of low molecular weight Indopol H-300 was acided. Mixing was continued for 45 minutes, and 0.29 kg Piccotac B-BHT was introduced. After 10 minutes, 1.77 kg of Indopol H-1900 was added. Lecithin, 0.0175 kg, was then added and the temperature set to 50° C. Twenty-five minutes later, a solution of 0.0175 kg benzoquinone dioxime dissolved in 0.360 kg tetrahydrofuran was filtered and added to the mixer under a nitrogen purge venting into a dry ice trap. Tetrahydrofuran was removed over 60 minutes. The mixer was then heated to 110° C. for 30 minutes, and the batch extruded through a 0.25 inch die.

Comparison Example B
Preparation of Component A- Using THF and Hexarie 15 parts EPDM polymer (EPSYN 55, Copolymer Corp.) was compounded with 5 parts N326 carbon black and 50.5 parts Indopol H-1900 and 26.4 parts Indopol H-300 in a Banbury at up to approximately 150° C. to form a masterbatch. The masterbatch was dissolved at about 90° C. to about 100° C. in hexane to form a cement. The cement was mixed in an Anchor turbine stainless steel mixing vessel between 80 to 150 rpm to form a homogenous mixture. The mixture was cooled, and most of 5.5 parts Piccotac B-BHT was added and dissolved at room temperature. Separately from the cement, 1.0 parts of a 5 percent solution of benzoquinone droxime (Lord Chemical Products) in tetrahydrofuran was prepared at a temperature of approximately 25° C. The solubilized benzoquinone dioxime was then charged to the cement under agitation and mixed for approximately 4–6 hours. After the benzoquinone dioxime was uniformly mixed throughout the cement, the various solvents were removed by heating to between approximately 70° and 100° C. and pulling a vacuum until most of the hexane and volatile solvents were removed.

Example 4
Vulcanization of Tire Sealant

To a Brabender plasticorder operating at 60 rpm and 65° C. was added 40.5 g of Example 1. After 3 minutes the torque was measured and 4.5 g of a "B" component was added. The "B" component was prepared by mixing 6.5 parts benzoyl peroxide (Luperco M 33%) and 1.4 parts t-butyl perbenzoate peroxide with n-octanol and a small portion of the low Piccotac B-BHT and thoroughly mixing at about 25° C.

Example 5, 6 and Comparison Example C and D
Vulcanization of Tire Sealant

The procedure of Example 4 was followed replacing Example 1 with Examples 2 and 3 and Comparison Examples C-D, respectively. Tables 1–3 show processing characteristics of Examples 4–6 in comparison to Examples C-D and the resulting p properties.

TABLE 1

Plasticoder Torque Response During Sealant Vulcanization[1]

| Example Number | Minimum | Maximum | Rise[2] | Time to Cure (min) |
|---|---|---|---|---|
| 4 | 426 | 521 | 95 | 4.66 |
| 5 | 449 | 540 | 91 | 7.93 |

TABLE 1-continued

Plasticoder Torque Response During Sealant Vulcanization[1]

| Example Number | Minimum | Maximum | Rise[2] | Time to Cure (min) |
|---|---|---|---|---|
| 6 | 451 | 526 | 75 | 4.22 |
| C | 410 | 480 | 70 | 1.80 |
| D | 380 | 480 | 100 | 1.80 |

[1]Torque in meter-grams
[2]Difference between maximum and minimum torque values.

TABLE 2

Solvent Swelling Behavior

| Example Number | Solvents Used | Swell Ratio | Solvent Clarity |
|---|---|---|---|
| 4 | None | 22.3 | Cloudy |
| 5 | None | 28.8 | Cloudy |
| 6 | None | 18.2 | Clear |
| C | THF | 22.8 | Clear |
| D | THF/Hexane | 27.4 | Clear |

TABLE 3

Benzoquinone Dioxime Particle Size

| Example Number | Average Size | Maximum Size | Standard Deviation | Approximate Time for Sealant Production (hrs.) |
|---|---|---|---|---|
| 4 | 1.9 | 6.9 | 1.30 | 2.5 |
| 5 | 1.8 | 8.7 | 1.40 | 2.5 |
| 6 | 1.5 | 5.5 | 0.64 | 2.5 |
| C | 1.3 | 5.5 | 1.00 | 6–8 |
| D | 7.7 | 44.8 | 6.00 | 24 |

Comparing Examples 4–6 with Comparison Examples C-D shows that the process of the present invention achieves a suitable particle size (1.1–3 microns) of p-benzoquinone dioxime in 2.5 hours rather than an 8 or 24 hour process. In addition, the cured material had a similar torque response on vulcanization and swell ratio indicating that the cure efficiency of the generally solvent free blending process of the present invention compared favorably with the conventional solvent blending process. Furthermore, the cure rate was slowed from 2.5 to 4–6 minutes since no trace amoiints of THF were present in the material, a positive result to allow additional time for seailant to be applied to the end use.

While the foregoing describes certain exemplary embodiments of the invention, modifications will be readily apparent to those skilled in the art. Thus, the scope of the invention is intended to be defined by the following claims.

What is claimed is:

1. A process for the preparation of a sealant composition comprising:
   a) mixing an elastomer, optionally in the substantial absence of an organic solvent;
   b) dispersing a quinoid curing agent in a polymer having a number-average molecular weight below about 5,000 to form a curing agent concentrate; and
   c) combining said curing agent concentrate with said elastomer to form said sealant composition.

2. The process of claim 1, wherein said elastomer comprises at least one polymer having a number-average molecular weight above about 50,000 and includes a polymer having a number-average molecular weight below about 5,000.

3. The process of claim 1, wherein the curing agent comprises from about 0.2 to about 2.0 parts by weight phr of said sealant composition.

4. The process of claim 1, wherein said quinoid curing agent in said sealant composition has a particle size less than about 5 microns.

5. The process of claim 1, wherein said elastomer is selected from the group consisting of EPDM, polybutadiene, butyl rubber, halo butyl rubber, acrylonitrile-butadiene copolymer, styrene-butadiene copolymer, natural rubber, cis polyisoprene, and combinations thereof.

6. The process of claim 1, wherein said polymer is selected from the group consisting of ethylene-propylene copolymer, ethylene-propylene-diene-terpolymer, polybutadiene, hydrogenated polybutadiene, butyl rubber, polypropylene, acrylonitrile-butadiene copolymer, styrene-butadiene copolymer, synthetic polyterpenes, thermoplastic olefins, pentaerythritol esters of hydrogenated rosins, triethylene glycol esters of hydrogenated rosins, vinyl toluene copolymers, alkyl aromatics, coumarore-indenes, depolymerized natural rubber, polybutenes and mixtures thereof.

7. The process of claim 1, wherein said curing agent concentrate is substantially free of an organic solvent.

8. The process of claim 1, wherein said sealant composition includes less than about 5.0 weight percent organic solvent.

9. The process of claim 1 further including the step of adding a co-curative peroxide to said sealant composition.

10. The process of claim 1 wherein the step a is performed in the substantial absence of organic solvent.

11. A process for providing a rubber masterbatch for a sealant composition comprising:
 a) mixing an elastomer and a tackifier to form a rubber masterbatch;
 b) dispersing a quinoid curing agent in a polymer having a number average molecular weight below about 5,000 to form a curing agent concentrate;
 c) combining said curing agent concentrate with said rubber masterbatch and continuing to mix to form said sealant; and
 d) applying said sealant to a tire.

12. The process of claim 11, wherein said elastomer comprises at least one polymer having a number-average molecular weight above about 50,000 and said tackifier comprises a polymer having a number-average molecular weight below about 5,000.

13. The process of claim 11, wherein said curing agent comprises from about 0.2 to about 2.0 parts by weight phr of said sealant.

14. The process of claim 11, wherein said elastomer is selected from the group consisting of EPDM, polybutadiene, butyl rubber, halo butyl rubber, acrylonitrile-butadiene copolymer, styrene-butadiene copolymer, natural rubber, cis polyisoprene, and combinations thereof.

15. The process of claim 11, wherein said polymer is selected from the group consisting of ethylene-propylene copolymer, ethylene-propylene-diene-terpolymer, polybutadiene, hydrogenated polybutadiene, butyl rubber, polypropylene, acrylonitrile-butadiene copolymer, styrene-butadiene copolymer, synthetic polyterpenes, thermoplastic olefins, pentaerythritol esters of hydrogenated rosins, triethylene glycol esters of hydrogenated rosins, vinyl toluene copolymers, alkyl aromatics, coumalrone-indenes, depolymerized natural rubber, polybutenes and mixtures thereof.

16. A rubber masterbatch composition comprised of:
 an elastomer selected from the group consisting of EPDM, polybutadiene, butyl rubber, halo butyl rubber, acrylonitrile-butadiene copolymer, styrene-butadiene copolymer, natural rubber, cis polyisoprene, and combinations thereof;
 a low molecular weight polymer selected from the group consisting of ethylene-propylene copolymer, ethylene-propylene-diene-terpolymer, polybuta(diene, hydrogenated polybutadiene, butyl rubber, polypropylene, acrylonitrile-butadiene copolymer, styrene-butadiene copolymer, synthetic polyterpenes, thermoplastic olefins, pentaerythritol esters of hydrogenated rosins, triethylene glycol esters of hydrogenated rosins, vinyl toluene copolymers, alkyl aromatics, coumarone-indenes, depolymserized natural rubber, polybutenes and mixtures thereof; and,
 a quinoid curing agent; said rubber masterbatch including less than 1 wt % organic solvent.

17. The rubber masterbatch of claim 16 including less than 10 ppm organic solvent.

18. A sealant composition comprised of: an elastomer selected from the group consisting of EPDM, polybutadiene, butyl rubber, halo butyl rubber, acrylonitrile-butadiene copolymer, styrene-butadiene copolymer, natural rubber, cis polyisoprene, and combinations thereof;
 a low molecular weight polymer selected from the group consisting of ethylene-propylene copolymer, ethylene-propylene-diene-terpolymer, polybutadiene, hydrogenated polybutadiene, butyl rubber, polypropylene, acrylonitrile-butadiene copolymer, styrene-butadiene copolymer, synthetic polyterpenes, thermoplastic olefins, pentaerythritol esters of hydrogenated rosins, triethylene glycol esters of hydrogenated rosins, vinyl toluene copolymers, alkyl aromatics, coumarone-indenes, depolymerized natural rubber, polybutenes and mixtures thereof; and,
 a quinoid curing agent; said sealant composition including less than 1 wt % organic solvent.

19. The sealant comprising claim 18, wherein the curing agent comprises from about 0.2 to about 2.0 parts by weight phr of said sealant composition.

20. The sealant composition of claim 18 including a co-curative peroxide.

21. The sealant composition of claim 18 including less than 10 ppm organic solvent.

22. A process for the preparation of a sealant composition comprising:
 a) mixing an elastomer in the substantial absence of an organic solvent;
 b) adding a quinoid curing agent to said elastomer in the substantial absence of an organic solvent; and
 c) continuing to mix said curing agent and with said elastomer to form said sealant composition, said sealant composition including less than 1 wt. % organic solvent.

23. The process of claim 22, wherein said sealant composition includes less than 10 ppm THF and hexane.

24. The process of claim 22, wherein the curing agent comprises from about 0.2 to about 2.0 parts by weight phr of said sealant composition.

* * * * *

UNITED STATES PATENT AND TRADEMARK OFFICE
CERTIFICATE OF CORRECTION

PATENT NO.   : 6,303,694 B1
DATED         : October 16, 2001
INVENTOR(S)  : Hogan et al.

It is certified that error appears in the above-identified patent and that said Letters Patent is hereby corrected as shown below:

Column 11,
Line 20, "coumarore" should read -- coumarone --
Line 64, "coumalrone" should read -- coumarone --

Column 12,
Line 17, "depolymserized" should read -- depolymerized --
Line 10, "polybuta(diene" should read -- polybutadiene --.

Signed and Sealed this

Thirtieth Day of July, 2002

Attest:

JAMES E. ROGAN
Attesting Officer
Director of the United States Patent and Trademark Office